US011601579B2

United States Patent
Jia

(10) Patent No.: US 11,601,579 B2
(45) Date of Patent: Mar. 7, 2023

(54) ELECTRONIC DEVICE

(71) Applicant: GUANGDONG OPPO MOBILE TELECOMMUNICATIONS CORP., LTD., Guangdong (CN)

(72) Inventor: Yuhu Jia, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 182 days.

(21) Appl. No.: 16/769,868

(22) PCT Filed: Nov. 30, 2018

(86) PCT No.: PCT/CN2018/118412
§ 371 (c)(1),
(2) Date: Jun. 4, 2020

(87) PCT Pub. No.: WO2019/114566
PCT Pub. Date: Jun. 20, 2019

(65) Prior Publication Data
US 2021/0176384 A1   Jun. 10, 2021

(30) Foreign Application Priority Data

Dec. 13, 2017 (CN) .......................... 201711331323.9

(51) Int. Cl.
*H04N 9/07* (2006.01)
*H04N 5/225* (2006.01)
(Continued)

(52) U.S. Cl.
CPC ......... *H04N 5/2257* (2013.01); *G02B 27/281* (2013.01); *G06V 10/147* (2022.01);
(Continued)

(58) Field of Classification Search
CPC .. H04N 5/2257; H04N 5/2253; H04N 5/2254; H04N 5/2256; H04N 5/332;
(Continued)

(56) References Cited

U.S. PATENT DOCUMENTS

| 2006/0146284 A1 | 7/2006 | Collins et al. |
| 2013/0135513 A1* | 5/2013 | Choi .................... H04N 5/2254 348/335 |

(Continued)

FOREIGN PATENT DOCUMENTS

| CN | 201005676 Y | 1/2008 |
| CN | 202257517 U | 5/2012 |

(Continued)

OTHER PUBLICATIONS

Communication pursuant to Article 94(3) EPC for EP Application 18888530.5 dated Jun. 8, 2021. (174 pages).

(Continued)

*Primary Examiner* — Patrick E Demosky
(74) *Attorney, Agent, or Firm* — Young Basile Hanlon & MacFarlane, P.C.

(57) ABSTRACT

An electronic device is provided. The electronic device includes a cover plate, a main board, an iris camera, an infrared lamp, a polarizing member. The iris camera is coupled with the main board and arranged on a side of the main board facing the cover plate. The infrared lamp is coupled with the main board and arranged on the side of the main board facing the cover plate. The infrared lamp is spaced apart from the iris camera. The polarizing member is arranged between the infrared lamp and the cover plate to reduce an angle of infrared light emitted from the infrared lamp.

18 Claims, 3 Drawing Sheets

(51) Int. Cl.
    *G02B 27/28* (2006.01)
    *G06V 10/147* (2022.01)
    *G06V 40/19* (2022.01)
    *H04M 1/02* (2006.01)

(52) U.S. Cl.
    CPC ........... *G06V 40/19* (2022.01); *H04N 5/2253* (2013.01); *H04N 5/2254* (2013.01); *H04N 5/2256* (2013.01); *H04M 1/0264* (2013.01)

(58) Field of Classification Search
    CPC ........ H04N 9/07; G06V 40/19; G06V 10/147; G06V 40/197; G02B 27/281; G02B 13/008; G02B 13/146; G02B 13/004; G02B 5/208; G02B 5/005; H04M 1/0264
    See application file for complete search history.

(56) References Cited

U.S. PATENT DOCUMENTS

| | | | |
|---|---|---|---|
| 2013/0218270 A1* | 8/2013 | Blanckaert | A61F 2/1627 623/6.22 |
| 2015/0062324 A1 | 3/2015 | Choi | |
| 2016/0011417 A1 | 1/2016 | Border et al. | |
| 2016/0092731 A1* | 3/2016 | Dainty | G06V 40/197 348/78 |
| 2017/0061210 A1* | 3/2017 | Ollila | H04N 5/2256 |
| 2017/0351929 A1 | 12/2017 | Kim | |

FOREIGN PATENT DOCUMENTS

| | | | |
|---|---|---|---|
| CN | 103190143 | A | 7/2013 |
| CN | 103530617 | A | 1/2014 |
| CN | 204946031 | U | 1/2016 |
| CN | 106548144 | A | 3/2017 |
| CN | 106597777 | A | 4/2017 |
| CN | 106598239 | A | 4/2017 |
| CN | 107065301 | A | 8/2017 |
| CN | 206387984 | U | 8/2017 |
| CN | 206429909 | U | 8/2017 |
| CN | 107390853 | A | 11/2017 |
| CN | 206649532 | U | 11/2017 |
| CN | 107451542 | A | 12/2017 |
| CN | 108055430 | A | 5/2018 |
| CN | 207352317 | U * | 5/2018 |
| JP | H07181368 | A | 7/1995 |
| KR | 20040095027 | A | 11/2004 |
| KR | 20130069077 | A | 6/2013 |
| TW | 201111835 | A | 4/2011 |
| WO | 2016143983 | A1 | 9/2016 |
| WO | 2017105608 | A1 | 6/2017 |

OTHER PUBLICATIONS

Indian Examination Report for IN Application 202017025819 dated Aug. 12, 2021. (6 pages).
Extended European Search Report for European Application No. 18888530.5 dated Aug. 28, 2020.
English translation of ISR for PCT application PCT/CN/2018118412 dated Feb. 29, 2019.
English translation of OA for CN application 201711331323.9 dated Jul. 1, 2019.
English translation of OA for CN application 201711331323.9 dated Sep. 26, 2019.
English translation of OA for CN application 201711331323.9 dated Jan. 6, 2020.
English translation of Decision of Rejection 201711331323.9 dated Apr. 28, 2020.
Summons to attend oral proceedings pursuant to Rule 115(1) EPC for EP Application 18888530.5 mailed Nov. 22, 2022 (7 pages).

* cited by examiner

ELECTRONIC DEVICE

CROSS-REFERENCE TO RELATED APPLICATION(S)

The present application is a 371 application of International patent Application No. PCT/CN2018/118412, filed on Nov. 30, 2018, which claims prior to Chinese Application No. 201711331323.9, filed on Dec. 13, 2017, the entire contents of both of which are incorporated by reference in their entireties.

TECHNICAL FIELD

The present disclosure relates to a technical field of communication equipment, and more particularly to an electronic device.

BACKGROUND

An iris lock is a kind of intelligent lock with a human iris as an identification carrier and means, which is a perfect crystallization of a computer information technology, an electronic technology, a mechanical technology and a modern hardware technology. The iris lock generally includes two parts, namely an electronic identification and control, and a mechanical linkage system. The uniqueness and the non-repeatability of the iris decide that the iris lock is the safest lock among all locks. In a related art, when the iris lock of the electronic device is to be unlocked, human eyes need to face toward an iris camera, and infrared light emitted from an infrared lamp enters the human eyes. Then, the infrared lamp is reflected into the iris camera by the human eyes, and the electronic device can be unlocked after the iris camera captures the infrared lamp.

SUMMARY

An electronic device according to a first aspect of embodiments of the present disclosure includes: a cover plate; a main board arranged at a rear side of the cover plate and spaced apart from the cover plate; an iris camera coupled with the main board and arranged on a side of the main board facing the cover plate; an infrared lamp coupled with the main board and arranged on the side of the main board facing the cover plate, the infrared lamp being spaced apart from the iris camera; and a polarizing member arranged between the infrared lamp and the cover plate to reduce an angle of infrared light emitted from the infrared lamp.

An electronic device according to a second aspect of embodiments of the present disclosure includes: a cover plate; a polarizing member arranged to a rear side of the cover plate; a main board arranged behind the polarizing member and spaced apart from the polarizing member; an iris camera coupled with the main board and arranged on a side of the main board facing the cover plate; and an infrared lamp coupled with the main board and arranged on the side of the main board facing the cover plate. The infrared lamp is spaced apart from the iris camera. The infrared lamp is arranged opposite to the polarizing member, and the polarizing member is configured to polarize infrared light emitted from the infrared lamp to reduce an angle of the infrared light emitted from the infrared lamp.

An electronic device according to a third aspect of embodiments of the present disclosure includes: a housing; a cover plate connected to the housing to enclose an inner space therebetween; a display screen and a polarizing member arranged to a rear side of the cover plate, and spaced apart from each other; an infrared lamp arranged in the inner space and facing the polarizing member; and an iris camera arranged in the inner space and spaced apart from the infrared lamp. The polarizing member is configured to polarize infrared light emitted from the infrared lamp to reduce an angle of the infrared light emitted from the infrared lamp.

Additional aspects and advantages of embodiments of present disclosure will be given in part in the following descriptions, become apparent in part from the following descriptions, or be learned from the practice of the embodiments of the present disclosure.

BRIEF DESCRIPTION OF DRAWINGS

The above and/or additional aspects and advantages of the present disclosure will become apparent and readily appreciated from the following descriptions of embodiments made with reference to the drawings.

DETAILED DESCRIPTION

Figure 1:
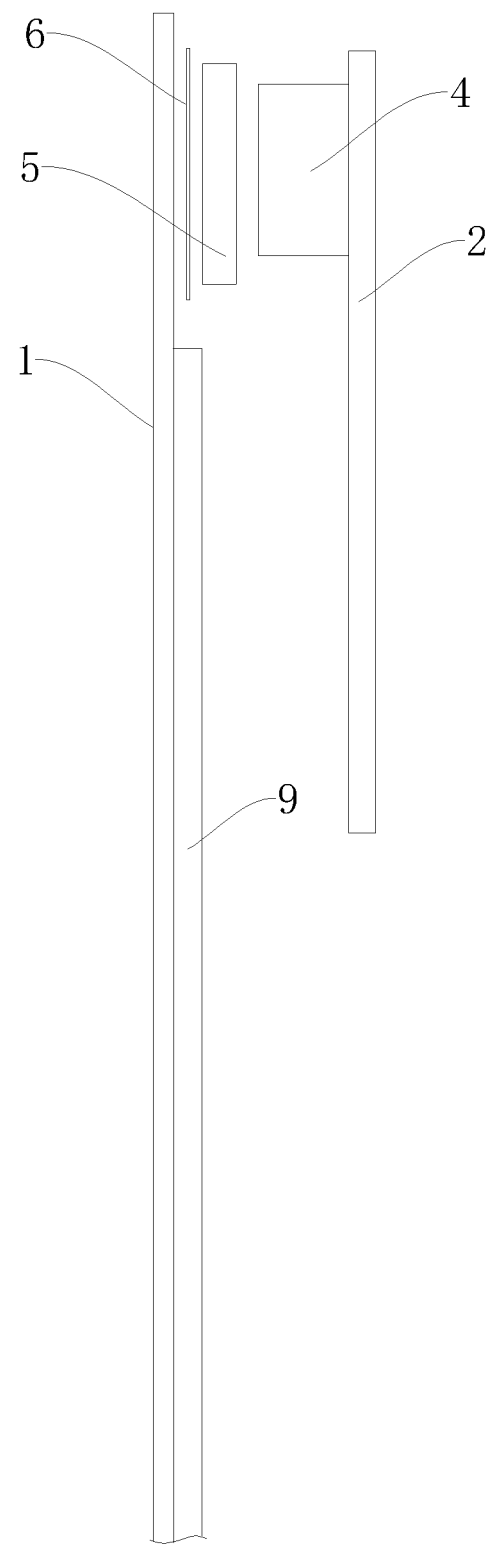
FIG. 1 is a partial schematic view of an electronic device according to an embodiment of the present disclosure.

Embodiments of the present disclosure are further described. Examples of the embodiments are illustrated in the accompanying drawings. The same or similar elements and the elements having same or similar functions are denoted by like reference numerals throughout the descriptions. The embodiments described below with reference to the accompanying drawings are examples, are intended to be used to explain the present disclosure, and cannot be construed as limitation to the present disclosure.

In the specification of the present disclosure, it is to be understood that, terms such as "central," "longitudinal," "lateral," "length," "width," "thickness," "upper," "lower," "front," "rear," "left," "right," "vertical," "horizontal," "top," "bottom," "inner," "outer," "axial," and "radial" indicate the orientation or position relationship based on the orientation or position relationship illustrated in the drawings only for convenience of description or for simplifying description of the present disclosure, and do not alone indicate or imply that the device or element referred to must have a particular orientation or be constructed and operated in a specific orientation, and hence cannot be construed as limitation to the present disclosure. In addition, the feature defined with "first" and "second" may comprise one or more of this feature. In the description of the present disclosure, the term "a plurality of" means at least two, such as two, three and so on, unless specified otherwise.

In the present disclosure, it should be noted that, unless specified otherwise, terms "mounted," "coupled," and "connected," are used broadly, for example, may be fixed connections, detachable connections, or integral connections; may also be mechanical or electrical connections; may also be direct connections or indirect connections via intervening structures; may also be inner communications of two elements, which may be understood by those skilled in the related art according to specific situations.

An electronic device 100 according to an embodiment of the present disclosure will be described below with reference to FIGS. 1-3.

Figure 2:
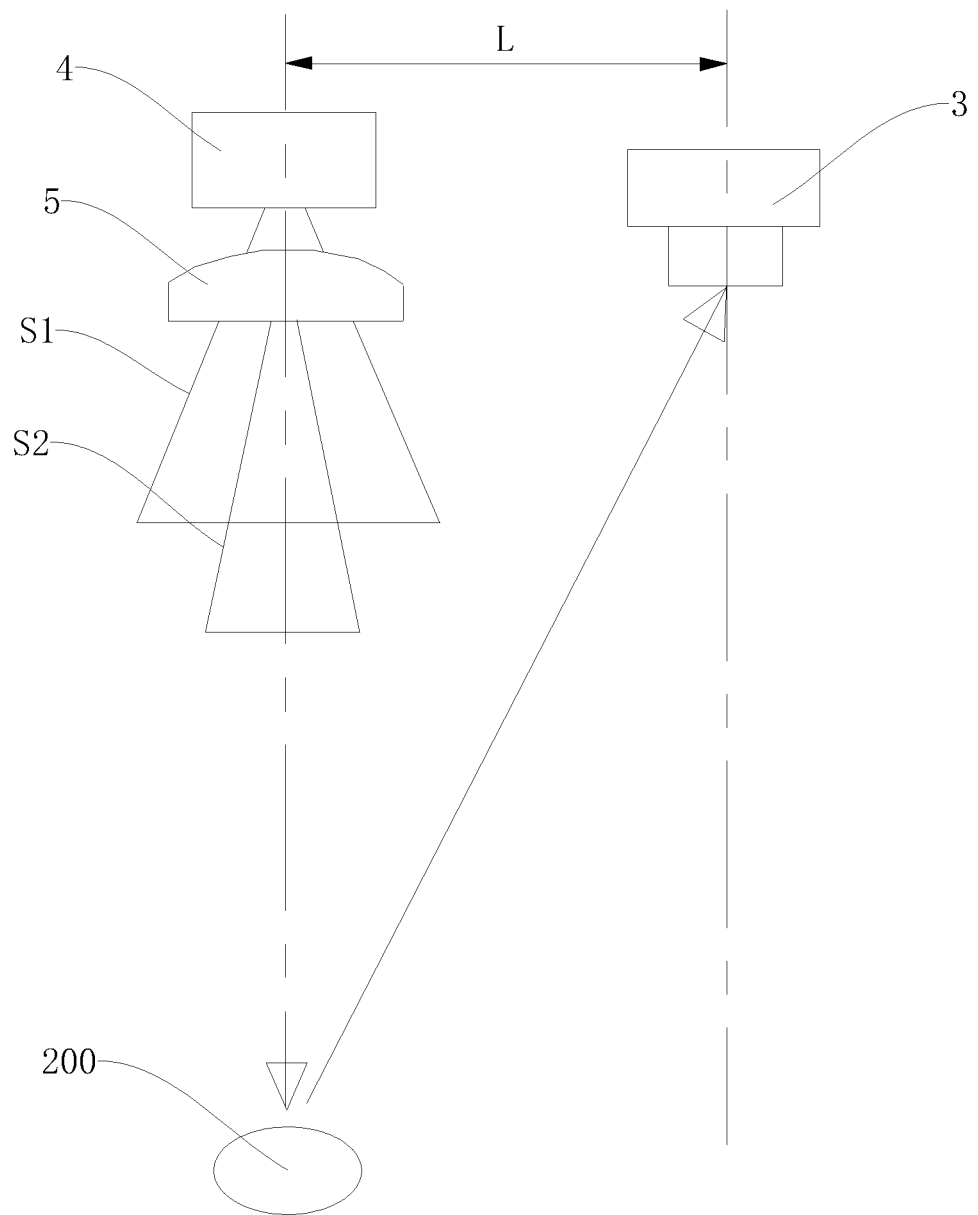
FIG. 2 is a schematic view illustrating a working principle of an electronic device according to an embodiment of the present disclosure.
Figure 3:
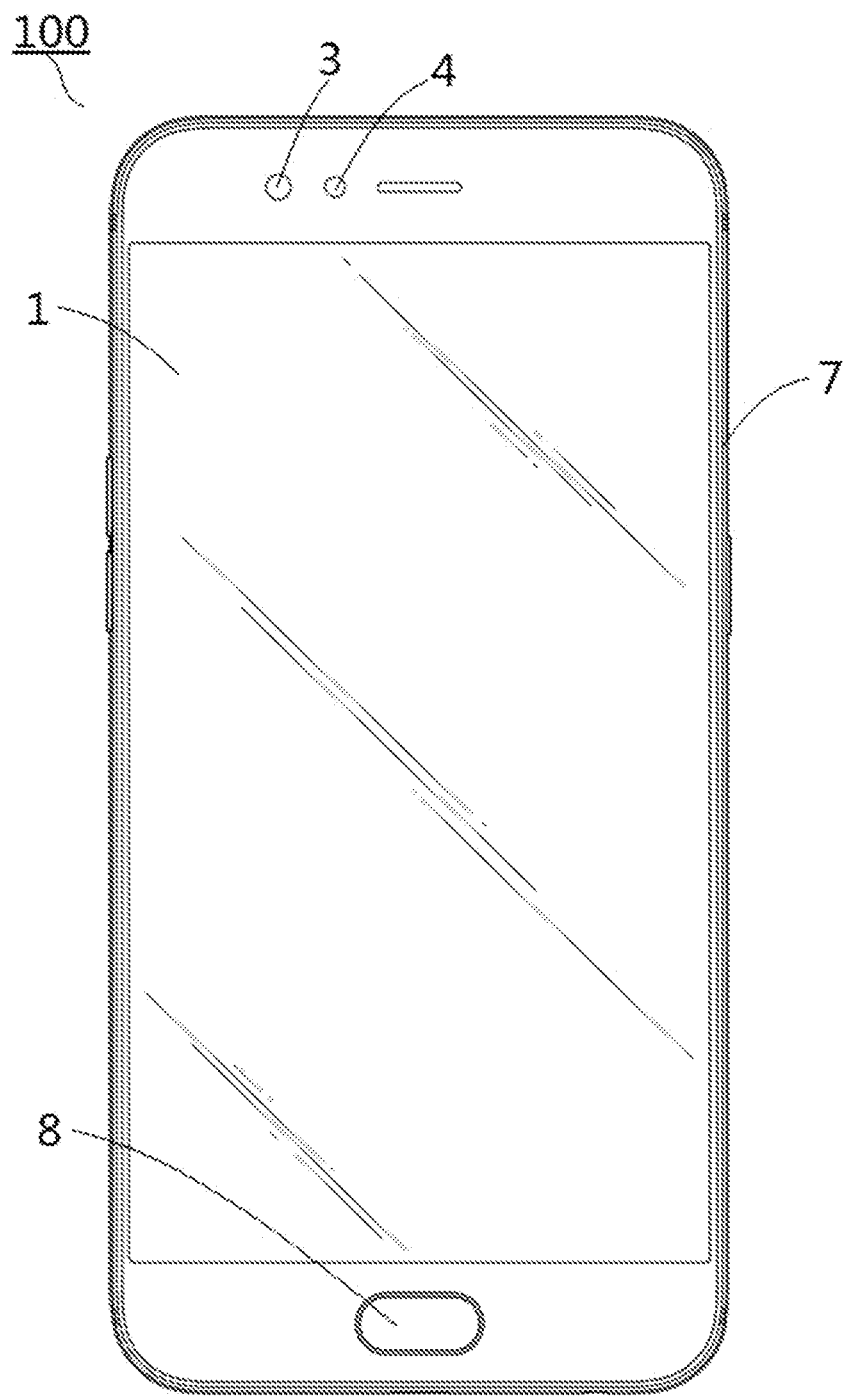
FIG. 3 is a schematic view of an electronic device according to an embodiment of the present disclosure.

As illustrated in FIGS. 1-3, the electronic device 100 according to the embodiment of the present disclosure includes a cover plate 1, a main board 2, an iris camera 3, an infrared lamp 4 and a polarizing member 5.

Specifically, the main board 2 is arranged at a rear side of the cover plate 1 and is spaced apart from the cover plate 1. The iris camera 3 is coupled with the main board 2 and is arranged on a side of the main board 2 facing the cover plate 1. The infrared lamp 4 is coupled with the main board 2 and is arranged on the side of the main board 2 facing the cover plate 1. The infrared lamp 4 is spaced apart from the iris camera 3.

It is known that the electronic device 100 (such as a mobile phone) with the iris camera 3 may be unlocked through the iris. In this case, human eyes 200 may face the infrared lamp 4, an infrared light emitted from the infrared lamp 4 enters the human eye 200 and then is reflected to the iris camera 3, and the electronic device 100 can be unlocked after the iris camera 3 captures the infrared light.

The polarizing member 5 is arranged between the infrared lamp 4 and the cover plate 1 to reduce an angle of infrared light emitted from the infrared lamp 4, i.e. an angel at which the infrared lamp 4 emits the infrared light. It can be understood that, due to the arrangement of the polarizing member 5, the infrared light emitted from the infrared lamp 4 passes through the polarizing member 5 first, and the angle of the infrared light emitted from the infrared lamp 4 may be reduced after the infrared light is polarized by the polarizing member 5, such that the energy of the infrared light per unit area can be effectively increased. That is, the energy of the infrared light entering the human eyes 200 per unit area can be increased, and then the iris camera 3 can identify more iris information after the infrared light is reflected to the iris camera 3 by the human eyes 200. In other words, the identification efficiency of the iris camera 3 is improved, and thus a success rate of unlocking the electronic device 100 is increased, that is, the reliability of unlocking the electronic device 100 is enhanced. In FIG. 2, S1 represents an area of the infrared light emitted from the infrared lamp 4 without the arrangement of the polarizing member 5, and S2 represents an area of the infrared light emitted from the infrared lamp 4 with the arrangement of the polarizing member 5.

Furthermore, the area of the infrared light emitted from the infrared lamp 4 herein may be understood as a field of vision (FOV) of the infrared lamp 4. In this case, S1 may also represent a field of vision of the infrared lamp 4 without the arrangement of the polarizing member 5, and S2 may also represent a field of vision of the infrared lamp 4 with the arrangement of the polarizing member 5.

That is, the field of version of the infrared lamp 4 may be reduced after the infrared light is polarized by the polarizing member 5, such that the energy of the infrared light per unit area can be effectively increased. Thus, the energy of the infrared light entering the human eyes 200 per unit area can be increased, and then the iris camera 3 can identify more iris information after the infrared light is reflected to the iris camera 3 by the human eyes 200. In other words, the identification efficiency of the iris camera 3 is improved, and thus a success rate of unlocking the electronic device 100 is increased, that is, the reliability of unlocking the electronic device 100 is enhanced.

It should to be noted that the polarizing member 5 reduces the angle of the infrared light emitted from the infrared lamp 4 and may be arranged according to the overall design requirements of the electronic device 100, such that the infrared lamp 4 in embodiments of the present disclosure may be an ordinary infrared lamp, i.e. a light without a polarizing function and a special customization. Therefore, the infrared lamp 4 in the embodiment of the present disclosure has a short manufacturing cycle and a low manufacturing cost, and the universality of the infrared lamp 4 can also be realized.

In the electronic device 100 according to the embodiment of the present disclosure, the polarizing member 5 is arranged between the infrared lamp 4 and the cover plate 1 to reduce the angle of the infrared light emitted from the infrared lamp 4. Thus, the energy of the infrared light per unit area can be effectively increased, and then the energy of the infrared light entering the human eyes 200 per unit area can be increased, so that the iris camera 3 can identify more iris information, thereby improving the identification efficiency of the iris camera 3 and further enhancing the success rate of unlocking the electronic device 100. That is, the reliability of unlocking the electronic device 100 is improved. Since the infrared lamp 4 does not need to be customized specially, the cost can be reduced and the universality of the infrared lamp 4 can be realized.

According to some embodiments of the present disclosure, a thickness of the polarizing member 5 decreases gradually in a radially outward direction from a central axis of the infrared lamp 4. Thus, the effect that the polarizing member 5 reduces the angle of the infrared light emitted from the infrared lamp 4 can be ensured, and further the reliability of unlocking the electronic device 100 can be ensured.

In some embodiments, a surface of the polarizing member 5 adjacent to the infrared lamp 4 is a conical surface or an arc surface, and a surface of the polarizing member 5 far away from the infrared lamp 4 is a flat surface, such that it is ensured that the thickness of the polarizing member 5 decreases gradually in the radially outward direction from the central axis of the infrared lamp 4. Thus, the effect that the polarizing member 5 reduces the angle of the infrared light emitted from the infrared lamp 4 can be ensured, and the reliability of unlocking the electronic device 100 can be ensured.

Furthermore, the surface of the polarizing member 5 far away from the infrared lamp 4 is parallel to the cover plate 1. That is, the surface of the polarizing member 5 adjacent to the cover plate 1 is parallel to the cover plate 1. Thus, it is easy to mount and fix the polarizing member 5 to the cover plate 1, which facilitates the improvement of the reliability of the electronic device 100. Additionally, an internal space of the electronic device 100 can be saved to a certain extent, which is conducive to the lightness of the electronic device 100.

In some embodiments, the surface of the polarizing member 5 adjacent to the infrared lamp 4 is a flat surface, and the surface of the polarizing member 5 far away from the infrared lamp 4 is a conical surface or an arc surface. Similarly, the thickness of the polarizing member 5 can be ensured to decrease gradually in the radially outward direction from the central axis of the infrared lamp 4. Thus, the effect that the polarizing member 5 reduces the angle of the infrared light emitted from the infrared lamp 4 can be ensured, and the reliability of unlocking the electronic device 100 can be ensured.

Furthermore, the surface of the polarizing member 5 adjacent to the infrared lamp 4 is parallel to the cover plate 1. Thus, the internal space of the electronic device 100 can be saved to a certain extent, which is conducive to the lightness of the electronic device 100.

In some embodiments, the surface of the polarizing member 5 adjacent to the infrared lamp 4 and the surface of the polarizing member 5 far away from the infrared lamp 4 both are a conical surface or an arc surface. Thus, the thickness of the polarizing member 5 can be ensured to decrease gradually in the radially outward direction from the central axis of the infrared lamp 4. Thus, the effect that the polarizing member 5 reduces the angle of the infrared light emitted from the infrared lamp 4 can be improved, and further the reliability of unlocking the electronic device 100 can be enhanced.

According to some embodiments of the present disclosure, a projection area of the polarizing member 5 on the cover plate 1 is larger than that of the infrared lamp 4 on the cover plate 1. Thus, all the infrared light emitted from the infrared lamp 4 may pass through the polarizing member 5, such that the polarizing member 5 reduces the angle of the infrared light emitted by the infrared lamp 4, thus improving the energy of the infrared light per unit area, further increasing the identification efficiency of the iris camera 3, and hence enhancing the reliability of unlocking the electronic device 100.

Furthermore, a projection region of the polarizing member 5 on the cover plate 1 covers a projection region of the infrared lamp 4 on the cover plate 1. Thus, it is ensured that all the infrared light emitted from the infrared lamp 4 passes through the polarizing member 5, such that the effect that the polarizing member 5 reduces the angle of the infrared light emitted from the infrared lamp 4 can be improved, and the success rate of unlocking the electronic device 100 can be enhanced.

According to some embodiments of the present disclosure, a distance between the central axis of the infrared lamp 4 and a central axis of the iris camera 3 is denoted as L. When 15 mm≤L≤40 mm, the internal layout of the electronic device 100 can be optimized, the light supplement effect of the infrared lamp 4 can be enhanced, and hence the stability and the accuracy of the iris identification function can be enhanced, such that the reliability of the electronic device 100 can be improved. In some embodiments, L=20 mm.

According to some embodiments of the present disclosure, a wavelength of the infrared light emitted from the infrared lamp 4 is 940 nm. A tolerance range of the wavelength may be ±20 nm. The infrared light of 940 nm provides an effective light source for the iris imaging, while is not visible to the human eyes 200, and thus the user experience is great. Moreover, the infrared light of 940 nm has a good identification effect for the black iris, and hence the infrared lamp 4 may be used for specific Asian people, thereby improving the use comfort and the identification efficiency.

In some embodiments, the cover plate 1 is a glass cover plate or a ceramic cover plate. Thus, the display effect of the electronic device 100 can be enhanced, and the appearance of the electronic device 100 is aesthetic. Also, the production cost of the electronic device 100 is saved.

In some embodiments, the polarizing member 5 may be a polymethyl methacrylate (PMMA) member, a polycarbonate (PC) member, etc. Thus, the cost can be reduced and the processing cycle can be further shortened. Generally, the processing and molding cycle only needs about one week, which thus has a limited impact on the progress of the whole project.

In some embodiments, the polarizing member 5 may be connected to the cover plate 1 through an adhesive layer 6, and hence it is easy to mount and fix the polarizing member 5. For example, the polarizing member 5 may be fixed to the cover plate 1 by means of a double-sided adhesive, a dispensed adhesive or the like.

The structure of the electronic device 100 according to one specific embodiment of the present disclosure will be described in detail below with reference to FIGS. 1-3. However, it should be noted that the following description is only an example. It is obvious that those skilled in the related art may combine or change or modify the technical solution or some technical features after reading the following solution of the present disclosure, and those combinations, changes and modifications also fall within the scope of protection claimed by the present disclosure.

As illustrated in FIGS. 1-3, the electronic device 100 according to the embodiment of the present disclosure includes a cover plate 1, a main board 2, an iris camera 3, an infrared lamp 4 and a polarizing member 5.

Specifically, the cover plate 1 is a glass cover plate. The main board 2 is arranged at a rear side of the cover plate 1 and is spaced apart from the cover plate 1. The iris camera 3 is coupled with the main board 2 and is arranged on a side of the main board 2 facing the cover plate 1. The infrared lamp 4 is coupled with the main board 2 and is arranged on the side of the main board 2 facing the cover plate 1. The infrared lamp 4 is spaced apart from the iris camera 3. A distance between a central axis of the infrared lamp 4 and a central axis of the iris camera 3 is denoted as L, and L=20 mm. A wavelength of infrared light emitted from infrared lamp 4 is 940 nm.

The polarizing member 5 is a polymethyl methacrylate (PMMA) member. The polarizing member 5 is arranged between the infrared lamp 4 and the cover plate 1 to reduce an angle of the infrared light emitted from the infrared lamp 4, and the reduced angle is at most 12°. A thickness of the polarizing member 5 decreases gradually in a radially outward direction from a central axis of the infrared lamp 4.

Specifically, a surface of the polarizing member 5 adjacent to the infrared lamp 4 is an arc surface, and a surface of the polarizing member 5 far away from the infrared lamp 4 is a flat surface. The surface of the polarizing member 5 far away from the infrared lamp 4 is parallel to the cover plate 1, and the polarizing member 5 may be fixed to the cover plate 1 by a double-sided adhesive. A projection region of the polarizing member 5 on the cover plate 1 covers a projection region of the infrared lamp 4 on the cover plate 1.

Specifically, the electronic device 100 further includes a housing 7, a key 8, and a display screen 9.

It should be noted that the electronic device 100 may be any device capable of acquiring data from outside and processing the data, or the electronic device 100 may be any device including a built-in battery and capable of charging the battery by drawing a current from outside, such as mobile phones, tablet computers, computing devices, information display devices, etc.

The mobile phone is taken as an example to introduce the electronic device 100 applicable to the present disclosure. In embodiments of the present disclosure, the mobile phone may include a radio-frequency circuit, a memory, an input unit, a wireless fidelity (Wi-Fi) module, a display unit, a sensor, an audio circuit, a processor, a projecting unit, a shooting unit, a battery and other components.

The radio-frequency circuit may be used to receive and transmit a signal during information transmission and reception or during a call. Especially, when downlink information from a base station is received, the radio-frequency circuit sends the downlink information to the processor for processing, and additionally sends uplink data from the mobile phone to the base station. Usually, the radio-frequency circuit includes but is not limited to an antenna, at least one amplifier, a transceiver, a coupler, a low-noise amplifier, a duplexer and etc. In addition, the radio-frequency circuit may communicate with the network and other devices via wireless communication. The above wireless communication may adopt any communication standard or protocol, including but not limited to global system for mobile communication (GSM), general packet radio service (GPRS), code division multiple access (CDMA), wideband code division multiple access (WCDMA), long term evolution (LTE), e-mail, short messaging service (SMS), etc.

The memory may be used to store software programs and modules, and the processor runs various function applications in the mobile phone and performs data processing by running the software programs and modules stored in the memory. The memory mainly includes a program storage area and a data storage area. The program storage area may store an operating system, at least one application program required for a function (such as a voice playback function, an image playback function and etc.); the data storage area may store data (such as audio data, contacts and etc.) created according to the use of the mobile phone. In addition, the memory may include a high-speed random access memory, and may also include a non-volatile memory, such as at least one disk storage device, a flash memory device, or other volatile solid-state memory devices.

The input unit may be configured to receive incoming numbers or character information, and generate a key signal related to user settings and function control of the mobile phone. Specifically, the input unit may include a touch panel and other input devices. The touch panel, also known as a touch screen, may collect a touch operation made by a user on or near the touch panel (for example, an operation made by the user on the touch panel or near the touch panel by means of a finger, a touch pen or any other suitable object or accessory), and drive the corresponding connection device according to a preset program. Optionally, the touch panel may include a touch detection device and a touch controller. The touch detection device is configured to detect a touch orientation of the user, detect a signal from the touch operation, and transmit the signal to the touch controller. The touch controller is configured to receive the touch information from the touch detection device, convert it into contact coordinates and send the contact coordinates to the processor, and is also configured to receive and execute a command from the processor. In addition, it is possible to realize the touch panel in resistive type, capacitive type, infrared type, surface acoustic wave type and other types. The input unit may include other input devices apart from the touch panel. Specifically, other input devices may include, but are not limited to one or more of a physical keypad, a key 8 (e.g. a volume control button, an on/off button, etc.), a trackball, a mouse and an operating rod.

The display unit may be used to display information that is input by the user or provided to the user and various menus of the mobile phone. The display unit may include a display panel, and optionally, the display panel may be configured in forms of a liquid crystal display (LCD), an organic light-emitting diode (OLED) or the like. Further, the touch panel may overlay the display panel. When the touch panel detects a touch operation on or near it, the touch operation is sent to the processor to determine which type the touch event belongs to, and then the processor provides a corresponding visual output on the display panel according to the type of the touch event.

The position in the external display panel of the visual output that the human eyes 200 can identify may serve as the "display area" below. The touch panel and the display panel may be used as two independent components to achieve input and output functions of the mobile phone, or the touch panel and the display panel may be integrated to achieve the input and output functions of the mobile phone.

In addition, the mobile phone may further include at least one sensor, such as an attitude sensor, a light sensor and other sensors.

Specifically, the attitude sensor may also be referred as a motion sensor, and as one of the motion sensors, a gravity sensor may be listed. The gravity sensor uses an elastic sensitive element to make a cantilever displacement device, and uses an energy storage spring made of the elastic sensitive element to drive an electric contact, so as to realize the conversion of the gravity change into the change of the electric signal.

As an alternative motion sensor, an accelerometer sensor may be used. The accelerometer sensor can detect the magnitude of acceleration in all directions (generally in three axes), and detect the magnitude and the direction of the gravity at rest, and can be used for attitude identification of the mobile phone (such as a horizontal and vertical screen switching, related games, a magnetometer attitude calibration), and functions related to vibration recognition (such as a pedometer and a tapping).

The motion sensors listed above may be used as an element for obtaining an "attitude parameter" described later, which is not limited thereto, however. Other sensors capable of obtaining the "attitude parameter" fall into the protection scope of the present disclosure, for example, a gyroscope. Moreover, the working principle and the data processing of the gyroscope may be similar to those in the related art, so the detailed description thereof will be omitted to avoid redundancy.

In addition, a barometer, a hygrometer, a thermometer, an infrared sensor or the like may be used as a sensor, which will not be described in detail.

The light sensor may include an ambient light sensor and a proximity sensor, in which the ambient light sensor can adjust brightness of the display panel in accordance with the ambient light, and the proximity sensor can turn off the display panel and/or the backlight when the mobile phone is moved to the ear.

The audio circuit, the loudspeaker and the microphone can provide an audio interface between the user and the mobile phone. The audio circuit can transmit an electrical signal converted from the received audio data to the loudspeaker, and the loudspeaker converts the electrical signal into an audio signal to be output. On the other hand, the microphone converts the collected audio signal into the electrical signal, and the audio circuit receives and converts the electrical signal into audio data, and transmits the audio data to the processor. After processed by the processor, the audio data is sent to, for example, another mobile phone via the radio-frequency circuit, or is output to the memory for further processing.

Wi-Fi is a short-distance wireless transmission technology, and the mobile phone can help the user to send and receive e-mails, browse websites, and access a streaming media by means of the Wi-Fi module which provides the user with a wireless broadband access to the Internet.

The processor is a control center of the mobile phone. The processor is coupled to various parts of the whole mobile phone by means of a variety of interfaces and lines, and performs various functions of the mobile phone and data processing by running or executing software programs and/or modules stored in the memory and by invoking the data stored in the memory, so as to monitor the electronic device overall. Optionally, the processor may include one or more processing units. Preferably, the processor may be integrated with an application processor and a modem processor, in which the application processor mainly handles the operating system, the user interface and the application program, while the modem processor mainly deals with the wireless communication.

It can be understood that the modem processor may be not integrated in the processor.

Moreover, the processor may serve as an implementing element of the above processing unit to execute functions that are same or similar to those of the processing unit.

The mobile phone further includes a power source (such as a battery) to supply electricity for each component.

The power source may be logically coupled to the processor by means of a power management system, to manage functions such as charging, discharging, and power management by means of the power management system. Although not shown, the electronic device may further include a Bluetooth module, which will not be described herein.

It should be noted that the mobile phone is only an example of the electronic device 100, which is not specifically limited in the present disclosure. The present disclosure may be applied to electronic devices such as the mobile phone, the tablet computer, etc., which is not limited in the present disclosure.

Reference throughout this specification to terms "an embodiment," "some embodiments," "an illustrative embodiment," "an example," "a specific example," or "some examples" means that a particular feature, structure, material, or characteristic described in connection with the embodiment or example is included in at least one embodiment or example of the present application. In this specification, the appearances of the aforesaid terms are not necessarily referring to the same embodiment or example. Moreover, the particular features, structures, materials, or characteristics described can be combined in any suitable manner in one or more embodiments or examples.

Although embodiments of the present disclosure have been illustrated and described above, it should be understood by those skilled in the art that changes, modifications, alternatives, and variations can be made in the embodiments without departing from principles and purposes of the present disclosure. The scope of this disclosure is defined by the claims and their equivalents.

What is claimed is:

1. An electronic device, comprising:
a cover plate;
a main board arranged at a rear side of the cover plate and spaced apart from the cover plate;
an iris camera coupled with the main board and arranged on a side of the main board facing the cover plate;
an infrared lamp coupled with the main board and arranged on the side of the main board facing the cover plate, the infrared lamp being spaced apart from the iris camera; and
a polarizing member arranged between the infrared lamp and the cover plate to reduce an angle of infrared light emitted from the infrared lamp,
wherein a thickness of the polarizing member decreases gradually in a radially outward direction from a central axis of the infrared lamp, and
wherein an orthographic projection area of the polarizing member on the cover plate is larger than an orthographic projection area of the infrared lamp on the cover plate.

2. The electronic device according to claim 1, wherein a surface of the polarizing member facing towards the infrared lamp is a conical surface or an arc surface, and a surface of the polarizing member facing away from the infrared lamp is a flat surface.

3. The electronic device according to claim 2, wherein the surface of the polarizing member facing away from the infrared lamp is parallel to the cover plate.

4. The electronic device according to claim 1, wherein a surface of the polarizing member facing towards the infrared lamp is a flat surface, and a surface of the polarizing member facing away from the infrared lamp is a conical surface or an arc surface.

5. The electronic device according to claim 4, wherein the surface of the polarizing member facing towards the infrared lamp is parallel to the cover plate.

6. The electronic device according to claim 1, wherein a surface of the polarizing member facing towards the infrared lamp and a surface of the polarizing member facing away from the infrared lamp both are a conical surface or an arc surface.

7. The electronic device according to claim 1, wherein a projection region of the polarizing member on the cover plate covers a projection region of the infrared lamp on the cover plate.

8. The electronic device according to claim 1, wherein a distance between a central axis of the infrared lamp and a central axis of the iris camera is denoted as L, and 15 mm≤L≤40 mm.

9. The electronic device according to claim 8, wherein L equals 20 mm.

10. The electronic device according to claim 1, wherein the cover plate is a glass cover plate or a ceramic cover plate.

11. The electronic device according to claim 1, wherein the polarizing member is a polymethyl methacrylate member or a polycarbonate member.

12. The electronic device according to claim 1, wherein a wavelength of the infrared light emitted from the infrared lamp is between 920 nm and 960 nm.

13. The electronic device according to claim 12, wherein the wavelength of the infrared light emitted from infrared lamp is 940 nm.

14. The electronic device according to claim 1, wherein the polarizing member is connected to the cover plate through an adhesive layer.

15. The electronic device according to claim 14, wherein the adhesive layer is arranged between the polarizing member and the cover plate by dispensing an adhesive therebetween.

16. The electronic device according to claim 1, wherein the polarizing member is further configured to reduce a field of vision of the infrared lamp.

17. An electronic device, comprising:
a cover plate;
a polarizing member arranged to a rear side of the cover plate;
a main board arranged behind the polarizing member and spaced apart from the polarizing member;
an iris camera coupled with the main board and arranged on a side of the main board facing the cover plate; and an infrared lamp coupled with the main board and arranged on the side of the main board facing the cover plate, the infrared lamp being spaced apart from the iris camera, wherein the infrared lamp is arranged opposite to the polarizing member, and the polarizing member is configured to polarize infrared light emitted from the infrared lamp to reduce an angle of the infrared light emitted from the infrared lamp, wherein a thickness of the polarizing member decreases gradually in a radially outward direction from a central axis of the infrared lamp, and wherein an orthographic projection area of the polarizing member on the cover plate is larger than an orthographic projection area of the infrared lamp on the cover plate.

18. An electronic device, comprising:

a housing;

a cover plate connected to the housing to enclose an inner space therebetween;

a display screen and a polarizing member arranged to a rear side of the cover plate, and spaced apart from each other;

an infrared lamp arranged in the inner space and facing the polarizing member; and an iris camera arranged in the inner space and spaced apart from the infrared lamp, wherein the polarizing member is configured to polarize infrared light emitted from the infrared lamp to reduce an angle of the infrared light emitted from the infrared lamp, wherein a thickness of the polarizing member decreases gradually in a radially outward direction from a central axis of the infrared lamp, and wherein an orthographic projection area of the polarizing member on the cover plate is larger than an orthographic projection area of the infrared lamp on the cover plate.

* * * * *